United States Patent [19]

Rice et al.

[11] 3,985,863

[45] Oct. 12, 1976

[54] PROCESS FOR THE SEPARATION AND RECOVERY OF AMMONIA AND ACID GASES

[75] Inventors: Robert D. Rice; Thomas H. Bossler, both of Monroeville Borough, Allegheny County; Charles W. Hamilton, Jr., North Huntingdon Township, Westmoreland County, all of Pa.

[73] Assignee: United States Steel Corporation, Pittsburgh, Pa.

[22] Filed: Apr. 18, 1975

[21] Appl. No.: 569,632

Related U.S. Application Data

[63] Continuation of Ser. No. 376,089, July 2, 1973, abandoned.

[52] U.S. Cl. ............................... 423/352; 423/238
[51] Int. Cl.² ........................................... C01C 1/00
[58] Field of Search ............... 423/238, 352, 376

[56] References Cited

UNITED STATES PATENTS

| 1,936,864 | 11/1933 | Sperr | 423/352 |
|---|---|---|---|
| 2,797,148 | 6/1957 | Carlson | 423/352 |
| 3,024,090 | 3/1962 | Rice | 423/352 |
| 3,186,795 | 6/1965 | Fields et al. | 423/238 |
| 3,718,731 | 2/1973 | Carlson et al. | 423/238 |
| 3,914,386 | 10/1975 | Anderson | 423/238 |

Primary Examiner—Oscar R. Vertiz
Assistant Examiner—Eugene T. Wheelock
Attorney, Agent, or Firm—William L. Krayer

[57] ABSTRACT

Vapor mixtures containing ammonia, acid gases and water are contacted with aqueous ammonium phosphate solution to separate the ammonia from the acid gases and to permit recovery of the acid gases. This treatment may be performed on vapor mixtures obtained by steam stripping liquids containing ammonia and acid gases.

6 Claims, 1 Drawing Figure

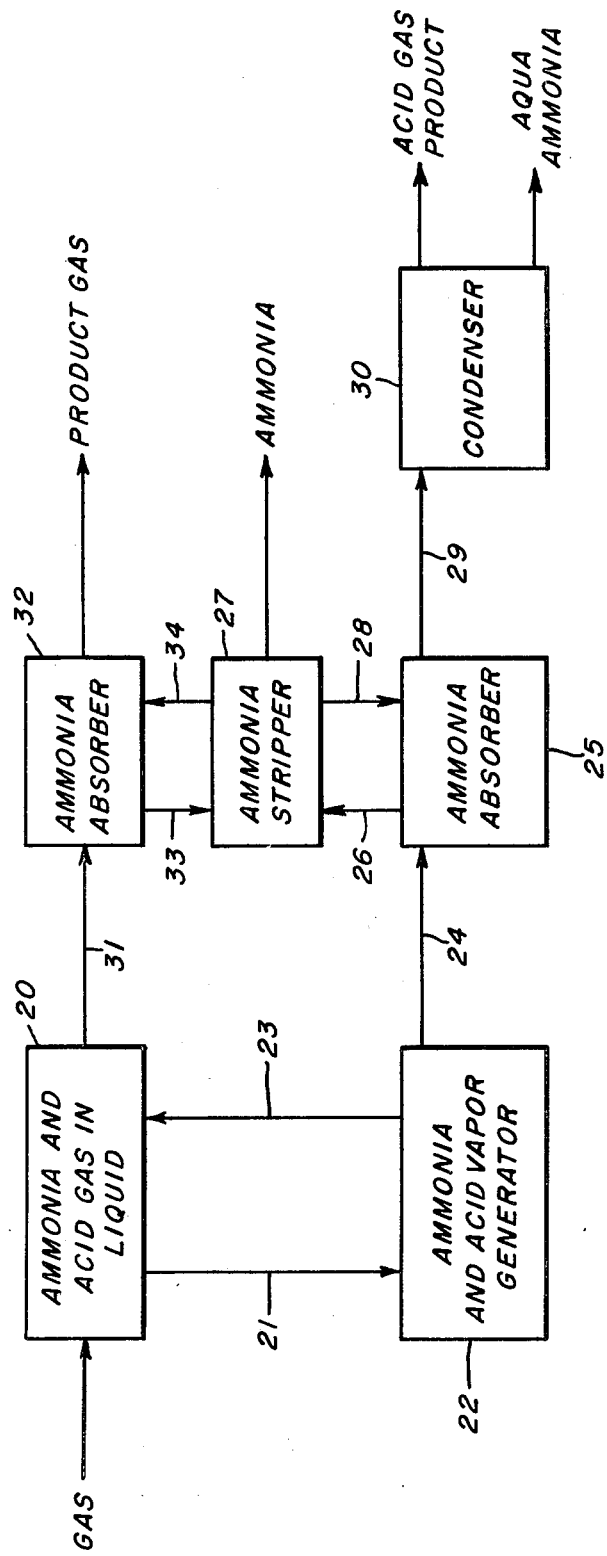

PROCESS FOR THE SEPARATION AND RECOVERY OF AMMONIA AND ACID GASES

This is a continuation of application Ser. No. 376,089, filed July 2, 1973, now abandoned.

BACKGROUND OF THE INVENTION

Gases containing significant concentrations of ammonia, acid gases and water vapor are difficult to process to separate the ammonia from the acid gases since treatment such as cooling or washing with water yields liquids containing substantial amounts of both ammonia and acid gases. Except at very low concentrations such liquids are very corrosive to both carbon steels and stainless steels. The processing of such liquids is complicated by the tendency of ammonia to combine with acid gases such as $H_2S$, $CO_2$, and HCN in water.

Another problem associated with the processing of gases containing, ammonia, acid gases and condensable water vapor is that during contact with media used for the absorption of ammonia, such as ammonium phosphate solutions, the removal of ammonia and the condensation of water vapor will increase the partial pressures of the acid gases in the gas phase, which increase solubility of these components in the aqueous medium.

Mixtures of ammonia and acid gases are difficult to separate. Typical successful prior processes, for example, involve contacting coke oven gas with ammonium phosphate solution for the recovery of ammonia as shown in U.S. Pat. No. 3,024,090 and U.S. Pat. No. 3,186,795. It can be seen that in these processes, the concentration of ammonia and acid gases has been low, generally on the order of 1–2 precent for each, and the temperature of absorption has been generally low, say between 30° and 60° C.

OBJECTS OF THE INVENTION

The objects of this invention include the following.

A method for the selective absorption of ammonia from mixtures with acid gases and water vapor by the use of aqueous ammonium phosphate solutions;

A method for treating such mixtures at temperatures above 70° C, particularly between 70° and 120° C.

A method for combining said absorption with subsequent condensation of the vapors from said absorption;

A method to eliminate corrosion in carbon steel or stainless steel equipment caused by the pressure of aqueous solutions of ammonia and acid gases;

A method to treat liquids containing ammonia and acid gases by generating vapors from said liquids, then contacting the vapors with ammonium phosphate solutions; and A method for treating gases such as are produced by the destructive distillation of coal, the reaction of coal with hydrogen or steam, the production of melamine or the like. These and other objectives as are apparent from the following specification and claims may be achieved by the invention hereinafter described.

DESCRIPTION OF THE INVENTION AND DRAWINGS

This invention includes contacting hot vapor containing ammonia, acid gases and water with aqueous ammonium phosphate solution under such conditions that there is no substantial decrease in volume of the treated gas and under conditions such that the ammonia will be absorbed in the solution.

The accompanying drawing is a schematic flow diagram of vapor generation from a liquid, treatment of the vapor and a combined gas treatment according to the invention.

The vapors with which this invention is concerned contain ammonia, acid gases and water as the predominant constituents; other minor components such as hydrocarbons may be present. The acid gases will generally be hydrogen sulfide, carbon dioxide and/or hydrogen cyanide. The water content of the gases will be at least 20% by volume; the ammonia content of the gases will be at least 2% by volume; the acid gases will be present in at least 1% by volume. The invention applies particularly to such mixtures having at least 50 volume percent water vapor; at least 2% of ammonia and at least 2% of acid gases. It particularly applies to such mixtures having at least 50% water vapor, 1 to 30 volume percent of acid gases and 1 to 50 percent of ammonia. It should be distinctly understood that the gas treatment of this invention applies to vapor streams that are directly produced having compositions as described and to gas streams that are treated to provide such compositions. This will be clear for the description of the figures. It is to be understood that as used herein, a "vapor" is a material is the gas phase but close to condensation temperature.

Referring now to the drawing, a preferred embodiment of the invention is illustrated in which a raw gas, such as coke oven gas, is absorbed or condensed to produce a liquid containing ammonia and acid gas, which liquid is then subjected to stripping whereby the ammonia and acid gas are removed from the liquid. The initial liquefaction may be performed by contacting the raw gas in a vessel 20 with an aqueous ammonia solution or cooling the gas with water injection, or cooling the gas below its dew point, all of which results in aqueous liquid that has ammonia and acid gas dissolved therein. While the original raw gas such as coke oven gas may contain ammonia, acid gases, and water vapor in small relative proportions, the liquid. e.g. water, will contain relatively large amounts of these components due to the solubility of ammonia therein and the complexes formed between the ammonia and the acid gases in water. The ammonia and acid gases will be in amounts of 0.5% or more by weight of the liquid. This liquid will pass by line 21 to a still 22. In the still, the liquid is boiled to drive off ammonia, acid gases and water vapor. The concentration of these components in the liquid is selected at suitably low values so that the liquid may be returned for further absorption and cooling of the coke oven gas. Typical values for instance are 0.1% by weight of acid gas and ammonia in water. At these concentrations, the liquid does not tend to corrode carbon steel or stainless steel vessels or pipes and the recovery of the ammonia and acid gases from the liquid is such that it is economical to further separate these components. The regenerated liquid may pass by line 23 to return to coke oven gas treatment or it may be discarded. The vapors will contain relatively large concentrations of ammonia and acid gases as well as water vapor. By line 24, the vapors pass to an ammonia absorber 25 where they contact an ammonium phosphate solution at or near its boiling point.

The ammonium phosphate solution leaves the absorber 25 by line 26 to an ammonia stripper 27 where it is heated to drive off impure aqueous ammonia. The $NH_3$ at this point is still relatively impure (75–90% water plus some acid gas). Regenerated phosphate solution returns to the absorber by line 28. Vapors from the absorber pass by line 29 to a condenser 30. In the condenser, the vapors are cooled below their dew point to condense a liquid fraction (aqua ammonia) containing the last traces of ammonia. This liquid fraction may be recycled to the original gas treatment, or it may be recycled to the ammonia and acid gas still 22. Acid gases leaving the condenser 30 may be further treated or utilized by various techniques known in the art.

Gas leaving vessel 20 passes by line 31 to an ammonia absorber 32 where it contacts an aqueous ammonium phosphate solution for absorption of ammonia. The phosphate solution leaves by line 33 to an ammonia stripper 27, where it is heated to drive off ammonia and regenerate lean phosphate solution for return by line 34 to the absorber. It will be appreciated that the flow rates of phosphate solution relative to gas flows can be varied so that the absorber on one line can be operated with the phosphate solution from another line. For example, the rich phosphate solution from the absorber 32 could be used as lean phosphate solution in absorber 25 and then be sent to a stripper. Product gas may be separated or treated by means conventional for coke oven gas or by low temperature cooling for separation into liquids, hydrocarbons and hydrogen.

A particularly useful feature of the invention is the ability to treat vapors containing high ratios of acid gas to ammonia. Where the acid gas content of the vapor is 25% of the ammonia or higher, this aspect of the invention is particularly advantageous. The higher ratios are especially suitable, e.g. acid gas concentrations of 50, 75, 100, 125, 150 or 200% of ammonia concentrations may be treated as described. The vapors containing acid gas concentrations approaching or greater than the ammonia concentrations are especially important because such mixtures are especially difficult to separate by conventional means.

The aqueous ammonia phosphate solutions for treating the mixtures of ammonia, acid gases and water vapor may be of the type described in U.S. Pat. No. 3,024,090. The ammonia content of the solution is described in terms of $n$ values for the formula: $(NH_4)_n H_{3-n}PO_4$. Lean solutions have $n$ values of 1.0 to 1.5 typically and are suitable to feed to an ammonia absorber. Rich solutions having $n$ values of 1.5 to 2.0 or more typically are suitable for stripping to recover ammonia. For this invention, rich solution values of $n$ preferably 1.55 to 1.8, are most advantageously used. Although solutions of any concentration will have at least some effect, we prefer to use concentrations of at least 5% ammonium phosphate.

Liquids containing ammonia and acid gases which may be stripped to yield vapors of ammonia, acid gases and water for contact with ammonium phosphate solution are obtained generally by either spraying water or aqueous solution into a gas having ammonia and acid gas components and/or by cooling such a gas until water condenses and absorbs the ammonia and acid gases. The presence of the ammonia tends to increase the solubility of the acid gases in water by complex salt formation. The concentration of ammonia and acid gases in the liquid may be at least 0.5% by weight of liquid. It is common to have concentrations of at least 2% by weight of liquid for both ammonia and the acid gases. At these concentrations, the high pH of liquid and the presence of the acid gases will tend to cause corrosion and hydrogen penetration in carbon steel.

The liquid containing ammonia and acid gases is boiled, generally with steam, to remove these components and reduce their effect to a level where corrosion with steel is inhibited. For example, coke oven gas may be sprayed with water or ammoniacal solution to either cool it or absorb hydrogen sulfide gas; the liquid will then have both acid gases and ammonia in it at concentrations of about 2% by weight. This liquid may be stripped by boiling with steam and the acid gas concentrations may be reduced to about 0.1% by weight. This stripped liquid may be used as such for cooling coke oven gas, or it may be mixed with make-up ammonia or aqueous ammonia and used again for hydrogen sulfide absorption. As well, a liquid stream may be split into one or more portions, one portion of which may be stripped as described above, and the stripped liquid recombined with the other portions for use in cooling coke oven gas, the combination has a concentration of acid gas components and ammonia such that corrosion of carbon steel would be minimized.

When practicing the processes of this invention, it is especially desirable that the ammonium phosphate solution be at or near its boiling point when in contact with the vapor containing water vapor, ammonia and acid gases. At the boiling point of the phosphate solution, there is no appreciably absorption of acid gases and no appreciable net condensation of water vapor so that the partial pressure of the acid gases does not increase and thereby increase the solubility of the acid gases in the phosphate solution. If desired, water vapor may be transferred from the phosphate solution to the gas with which it is in contact in order to prevent the increase of partial pressure of acid gases. The boiling point of this phosphate solution will depend upon the prevailing pressure. The contacting may occur at pressures as low at 0.25 atmospheres absolute up to 2 atmospheres absolute. Corresponding boiling points will range from about 70° C up to 120° C. Preferably, the contacting will be done in the range from 90° C to 120° C, particularly in the range of 95° C to 115° C, especially above at least 105° C. At these high temperatures, it is often possible to take a vapor as produced or as is available from such conventional processing equipment as sour water strippers and ammonia liquor stills, and then treat it directly with phosphate solutions; this saves additional costs in eliminating intermediate cooling steps.

As has been described in connection with the drawing, a vapor may be contacted with the ammonium phosphate solution and the exit vapors from this contact step may be treated in a conventional manner. As has also been described in connection with FIG. 2, a primary gas may be treated with a liquid which absorbs ammonia and acid gases, the resulting liquid is then stripped to remove the ammonia vapor and acid gases, which are then contacted with ammonium phosphate solution. Moreover, an original gas stream may be split into two or more fractions, one fraction of which may be directly contacted with the ammonium phosphate solution as described and the other fraction may be treated with a liquid which liquid then has the ammonia vapor and acid gas components stripped and contacted with ammonium phosphate solution. In another embodiment of the invention, a primary gas source may be split into two or more portions, one or more of these portions may be treated as has been described either by the direct contact with ammonium phosphate solution, or contacting with a liquid which liquid is then stripped to provide vapor suitable for contacting with the ammonium phosphate solution while the remaining portions of the primary source are treated in an otherwise conventional manner.

Processes for the production of vapors which may be directly contacted with the ammonium phosphate solution are the production of melamine, the exit vapors from ammonia stills and the reaction of coal with hydrogen. Typical compositions are in parts by weight:

| Ammonia | Acid Gas | Water Vapor |
|---------|----------|-------------|
| 4       | 1        | 95          |
| 13      | 21       | 64          |
| 45      | 16       | 39          |

Hydrogen or other hydrocarbons may also be present as long as the composition satisfies the relationship described previously.

To further exemplify the practice of the invention, the following examples are given.

EXAMPLE 1

Coke oven gas at elevated pressure is cooled by a water spray to yield a liquid having 3.5% by weight of ammonia, 3.5% by weight of carbon dioxide, 2.05 by weight of hydrogen sulfide and 0.10% by weight of hydrogen cyanide. This liquid is very corrosive to carbon and stainless steels. To lower the concentration of ammonia and acid gases of this liquid a fraction of the liquid is boiled with steam at 5 psia. The stripped liquid is then recombined with the fraction of other liquid obtained from the gas cooler and this combined mixture is recycled to the gas cooler. The combined mixture has a concentration of 0.6% by weight of ammonia, 0.25% by weight of hydrogen sulfide and 0.6% by weight of carbon dioxide and is not corrosive. The vapor generated by stripping the liquid has 7.8 volume percent of ammonia, 4.7 volume percent of acid gases and 87.5 volume percent of water vapor. This vapor is contacted with an ammonium phosphate solution under a pressure of 5 psia such that the boiling point of the solution is 70° C. Over 95% of the ammonia stripped from the liquid is recovered in the ammonium phosphate solution while no acid gas is absorbed. The exit gases from the absorber may be partially condensed to recover the remainder of the ammonia and some water vapor; the vapors from such a partial condensation step are essentially acid gases and water vapor. The sulfur content of the acid gases may by known methods be recovered as elemental sulfur or sulfuric acid. The ammonia absorbed in the ammonium phosphate solution may be recovered as pure anhydrous ammonia.

EXAMPLE 2

Coal is reacted with steam and oxygen to produce a gas which because of its high temperature is cooled with water. The quench water stream is stripped with stream to produce a vapor containing:

| $NH_3$      | 1140 lbs/hr |
| $CO_2$      | 3400 lbs/hr |
| $H_2S$      | 660 lbs/hr  |
| water vapor | 6180 lbs/hr |
| other gases | 100 lbs/hr  |

This gas is at a temperature of 109° C and is contacted with an ammonium phosphate solution boiling at this temperature to produce an exit vapor having:

| $NH_3$      | 19 lbs/hr   |
| $CO_2$      | 3400 lbs/hr |
| $H_2S$      | 660 lbs/hr  |
| water vapor | 9620 lbs/hr |
| other gases | 100 lbs/hr  |

As can be seen, the addition of water vapor to the gases prevents an increase in the partial pressure of the acid gases. This exit vapor is condensed to recover 7900 lbs/hr of water vapor and the remaining ammonia. The overhead vapors from this condensation may be cooled to separate the acid gases.

EXAMPLE 3

A melamine production process yields a gas stream at 120° C having the following composition:

| $NH_3$      | 7014 lbs/hr |
| $CO_2$      | 7123 lbs/hr |
| water vapor | 6823 lbs/hr |

This is contacted with ammonium phosphate solution to produce an exit vapor having:

| $NH_3$      | 19 lbs/hr    |
| $CO_2$      | 7123 lbs/hr  |
| water vapor | 17030 lbs/hr |

This vapor may be condensed to remove the remaining ammonia and most of the water vapor.

While this invention has been described in terms of specific examples, it should be understood that it includes such variations in process conditions and chemical compositions for these processes as would be deemed equivalent by one skilled in the art.

We claim:

1. A method of recovering ammonia substantially free of acid gases from vapor containing ammonia and acid gases, and at least 50% by volume of water vapor, comprising washing the vapor with a solution containing ammonium phosphate at or near its boiling point and distilling or stripping $NH_3$ from said solution.

2. The method of claim 1 in which the vapor contains from 1% to 30% by volume acid gases.

3. The method of claim 1 in which the vapor contains from 1% to 50% by volume ammonia.

4. The method of claim 1 in which the vapor is produced by distillation or stripping from a solution containing ammonia.

5. A method of recovering ammonia substantially free of acid gases from a gaseous mixture including acid gases, ammonia and water vapor, comprising:
   a. washing said gaseous mixture with aqueous ammonia to obtain a solution of acid gases and ammonia,
   b. removing the ammonia from said solution by distillation or stripping, to obtain an ammonia-containing vapor, including at least 50% by volume water vapor,
   c. washing the ammonia-containing vapor with a solution containing ammonium phosphate at or near its boiling point to absorb ammonia therein, and d. removing ammonia from the ammonium phosphate solution.

6. A method of recovering ammonia from a gaseous mixture including ammonia and water vapor comprising a. condensing an ammonia-containing solution from said gaseous mixture, b. stripping an ammonia-containing vapor including at least 50% by volume water vapor from said ammonia-containing solution, c. washing the ammonia-containing vapor with a solution containing at least five percent ammonium phosphate at or near its boiling point to absorb ammonia therein, and d. distilling or stripping ammonia from the ammonium phosphate solution.

* * * * *

UNITED STATES PATENT OFFICE
CERTIFICATE OF CORRECTION

Patent No. 3,985,863      Dated October 12, 1976

Inventor(s) Robert D. Rice et al.

It is certified that error appears in the above-identified patent and that said Letters Patent are hereby corrected as shown below:

Column 1, line 48, "pressure" should eread -- presence --.

Column 4, line 26, "appreciably" should read -- appreciable --.

Column 5, line 26, "2.05" should read -- 2.0% --.

Column 5, line 60, before "to" change "stream" to read -- steam --.

Signed and Sealed this

Twenty-eighth Day of December 1976

[SEAL]

Attest:

RUTH C. MASON
Attesting Officer

C. MARSHALL DANN
Commissioner of Patents and Trademarks